(12) United States Patent
Chun

(10) Patent No.: US 7,110,625 B2
(45) Date of Patent: Sep. 19, 2006

(54) APPARATUS TO INDUCE STRESS INTO A FIBER OPTIC CABLE TO DETECT SECURITY FENCE CLIMBING

(75) Inventor: Hong Gi Chun, Seoul (KR)

(73) Assignee: Formguard Inc., Seoul (KR)

( * ) Notice: Subject to any disclaimer, the term of this patent is extended or adjusted under 35 U.S.C. 154(b) by 180 days.

(21) Appl. No.: 10/941,952

(22) Filed: Sep. 16, 2004

(65) Prior Publication Data

US 2006/0054796 A1 Mar. 16, 2006

(51) Int. Cl.
*G02B 6/00* (2006.01)
*G08B 13/00* (2006.01)

(52) U.S. Cl. .......................... 385/12; 385/13; 385/100; 340/341; 340/550; 340/555

(58) Field of Classification Search ................. 385/12, 385/13, 100; 340/341, 550, 555, 556, 557
See application file for complete search history.

(56) References Cited

U.S. PATENT DOCUMENTS

| | | | |
|---|---|---|---|
| 4,275,294 A | 6/1981 | Davidson | 250/227.11 |
| 4,371,869 A | 2/1983 | Davidson | 340/557 |
| 4,399,430 A | 8/1983 | Kitchen | 340/550 |
| 4,450,434 A | 5/1984 | Nielsen et al. | 340/506 |
| 4,558,308 A | 12/1985 | Ciordinik et al. | 340/550 |
| 4,676,485 A | 6/1987 | Ciordinik et al. | 256/12 |
| 4,680,573 A | 7/1987 | Ciordinik et al. | 340/341 |
| 4,777,476 A * | 10/1988 | Dank | 340/541 |
| 4,829,286 A * | 5/1989 | Zvi | 340/541 |
| 5,134,386 A | 7/1992 | Swanic | 340/341 |
| 5,416,467 A | 5/1995 | Ohata et al. | 340/555 |
| 5,434,557 A | 7/1995 | Alizi | 340/355 |
| 5,592,149 A | 1/1997 | Alizi | 340/550 |
| 6,937,151 B1 * | 8/2005 | Tapanes | 340/550 |

FOREIGN PATENT DOCUMENTS

| | | | |
|---|---|---|---|
| KR | 1997-0009968 | 6/1997 | 385/12 X |
| KR | 20-0205489 | 12/2000 | 385/12 X |
| KR | 20-0205490 | 12/2000 | 385/12 X |

* cited by examiner

*Primary Examiner*—Brian M. Healy
(74) *Attorney, Agent, or Firm*—Birch, Stewart, Kolasch & Birch, LLP

(57) ABSTRACT

A stress inducing device for inducing stress into a fiber optic cable is useful for detecting a person attempting to breach a security fence by climbing over the security fence. A stress inducing device is attached adjacent to a top of each fence post of the security fence. A fiber optic cable runs adjacent to a top of the security fence, and passes through each of the stress inducing devices. Once activated, a pressing member of the stress inducing device will pinch the fiber optic cable therein causing an alarm. The stress inducing device will be activated if a person leans a ladder against the fiber optic cable or the stress inducing device itself, or if a person attempts to open or tamper with the stress inducing device.

25 Claims, 7 Drawing Sheets

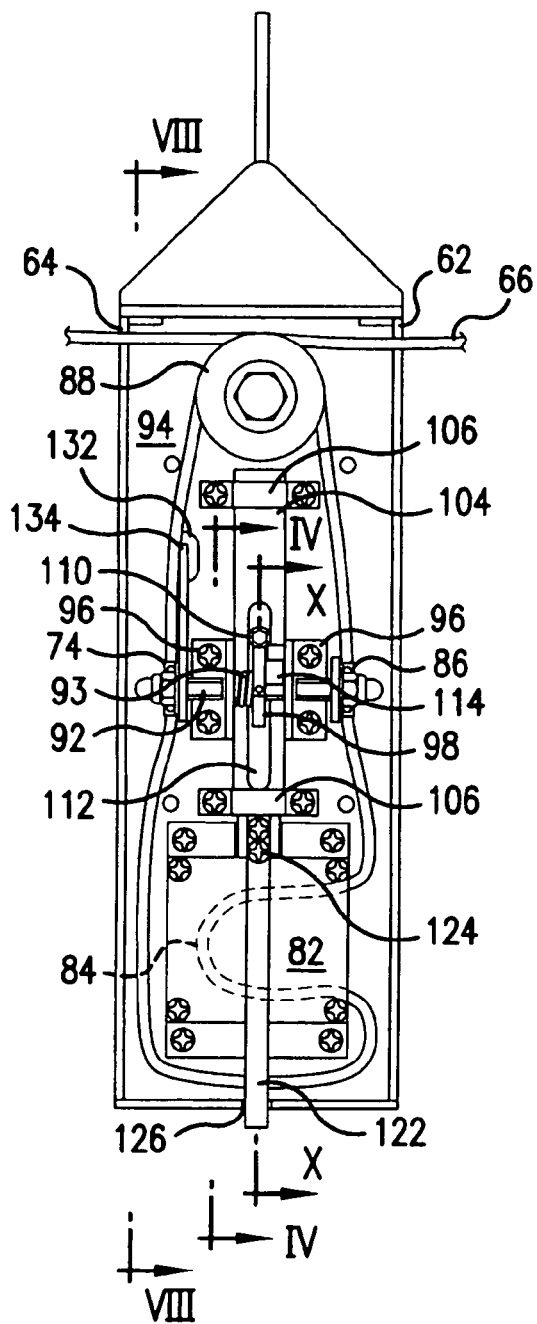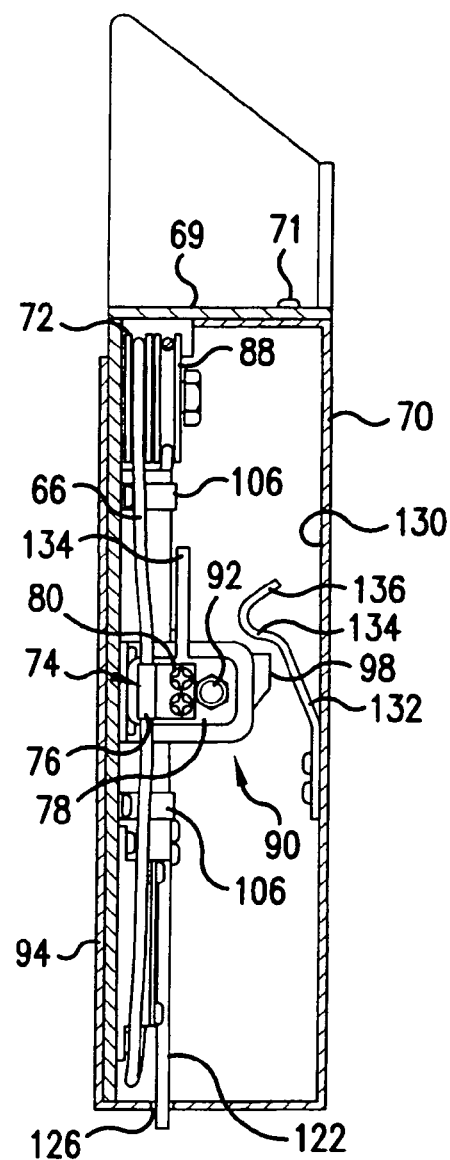
FIG.7
FIG.8

APPARATUS TO INDUCE STRESS INTO A FIBER OPTIC CABLE TO DETECT SECURITY FENCE CLIMBING

BACKGROUND OF THE INVENTION

1. Field of the Invention

The present invention relates to a security fence employing a fiber optic cable attached to the security fence to monitor the integrity of the fence against intrusion or tampering. More particularly, the present invention relates to a device for inducing a stress into a fiber optic cable if a weight is placed upon the fiber optic cable or against the device itself.

2. Description of the Related Art

Security fences employing a fiber optic cable monitoring scheme are generally known in the background. For example, see applicant's prior application Ser. No. 10/713,425 filed Nov. 17, 2003, pending, entitled "APPARATUS AND METHOD TO DETECT AN INTRUSION POINT ALONG A SECURITY FENCE," which is herein fully incorporated by reference. Also see applicant's prior application Ser. No. 10/842,545 filed May 11, 2004, pending, entitled "CLIPS FOR HOLDING FIBER OPTIC CABLES OF A SECURITY FENCE" which is herein fully incorporated by reference. Also see U.S. Pat. Nos. 4,275,294; 4,371,869; 4,399,430; 4,450,434; 4,558,308; 4,676,485; 4,680,573; 5,134,386; 5,416,467; 5,592,149; and the assignees' prior Korean Patents 1997-0009968, 20-0205489, and 20-0205490.

In the systems known in the background art, a length of fiber optic cable is formed into a pattern, such as a zigzagging pattern. The pattern is attached to an existing barrier type fence, such as a galvanized chain-link fence. The pattern in the fiber optic cable has a weave size and/or shape, which is smaller than the size of a human, so that a human cannot pass though the weave pattern without disrupting the fiber optic cable. In other words, a person would need to cut the fiber optic cable or severely distort the cable (e.g. by bending, stretching and/or pinching) to form a hole in the pattern large enough to pass through. Any such cutting or distortion of the fiber optic cable will interrupt or interfere with light passing through the fiber optic cable and will cause an alarm to be raised.

FIG. 1 illustrates a galvanized chain-link fence 10, in accordance with the background art. In FIG. 1, a fiber optic cable 12 is formed into a zigzagging pattern and attached to the barrier fence 10. A plurality of clips 14 hold the fiber optic cable in the zigzagging pattern. FIG. 2 is a close-up view of the zigzagging pattern of the fiber optic cable 12, with the barrier fence 10 removed for clarity.

SUMMARY OF THE INVENTION

The Applicant has discovered drawbacks in the state of the art fiber optic security fences.

One drawback of the background art is that if a person leans a ladder against the fence, a person might be able to climb the ladder and jump over the fence without raising an alarm. In other words, the person would not need to cut the fiber optic cable or severely distort the cable (e.g. by bending, stretching and/or pinching) to form a hole in the pattern large enough to pass through. Rather, a person's weight would be mostly transmitted to the ground through the ladder. Only a small portion of the person's weight would be transmitted to the fence due to the ladder leaning against the fence at an acute angle. Under most conditions, the weight pressing against the fence would be insufficient to bend or stress the fiber optic cable to such an extent to trigger an alarm. As such, the person would climb the ladder to the top of the fence and jump over the fence.

One solution conceived by the Applicant was to string a linear run of a fiber optic cable along an upper end of the fence. The linear run of fiber optic cable would pass through stress inducing devices attached to posts of the fence. The stress inducing devices would sense the slightest pressure against the linear run of fiber optic cable, and in response, would imposed a significant stress on a portion of the linear run of fiber optic inside the stress inducing device.

Applicant's first solution solved the situation of detecting a ladder leaned against any portion of the fence between the fence posts. However, a person might also lean a ladder against an upper portion of the fence post and/or the stress inducing device, itself. In response, Applicant has devised an inventive mounting system, which includes a tripping mechanism that can sense a force against a housing of the stress inducing device. Further, Applicant has devised additional tripping mechanisms which can sense if a person attempts to open the housing of the stress inducing device. Further, Applicant has devised additional inventive features, such as a visual indicator to indicate a "tripped" state of the stress inducing device.

It is an object of the present invention to address one or more of the applicant's appreciated potential drawbacks of the security fence design in accordance with the background art.

It is an object of the present invention to provide a device to detect a stress imposed on a fiber optic cable.

It is a further object of the present invention to provide a device to detect a stress imposed on a cable ran along a fence and to create a stress on a fiber optic cable capable for detection by an alarm system.

It is a further object of the present invention to provide a device capable of inducing a stress in a fiber optic cable when a stress is imposed on the device.

It is a further object of the present invention to provide a device to detect an attempted opening of the device and to create a stress on a fiber optic cable capable of detection by an alarm system.

These and other objects are accomplished by a stress inducing device for inducing stress into a fiber optic cable to detect a person attempting to breach a security fence by climbing over the security fence. A stress inducing device is attached adjacent to a top of each fence post of the security fence. A fiber optic cable runs adjacent to a top of the security fence, and passes through each of the stress inducing devices. Once activated, a pressing member of the stress inducing device will pinch the fiber optic cable therein causing an alarm. The stress inducing device will be activated if a person leans a ladder against the fiber optic cable or the stress inducing device itself, or if a person attempts to open or tamper with the stress inducing device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 7 is a plan view of the stress inducing device with a front cover removed;

FIG. 8 is a cross sectional view of the stress inducing device taken along line VIII—VIII of FIG. 7, with the cover installed;

DETAILED DESCRIPTION OF A PREFERRED EMBODIMENT

Figure 1:
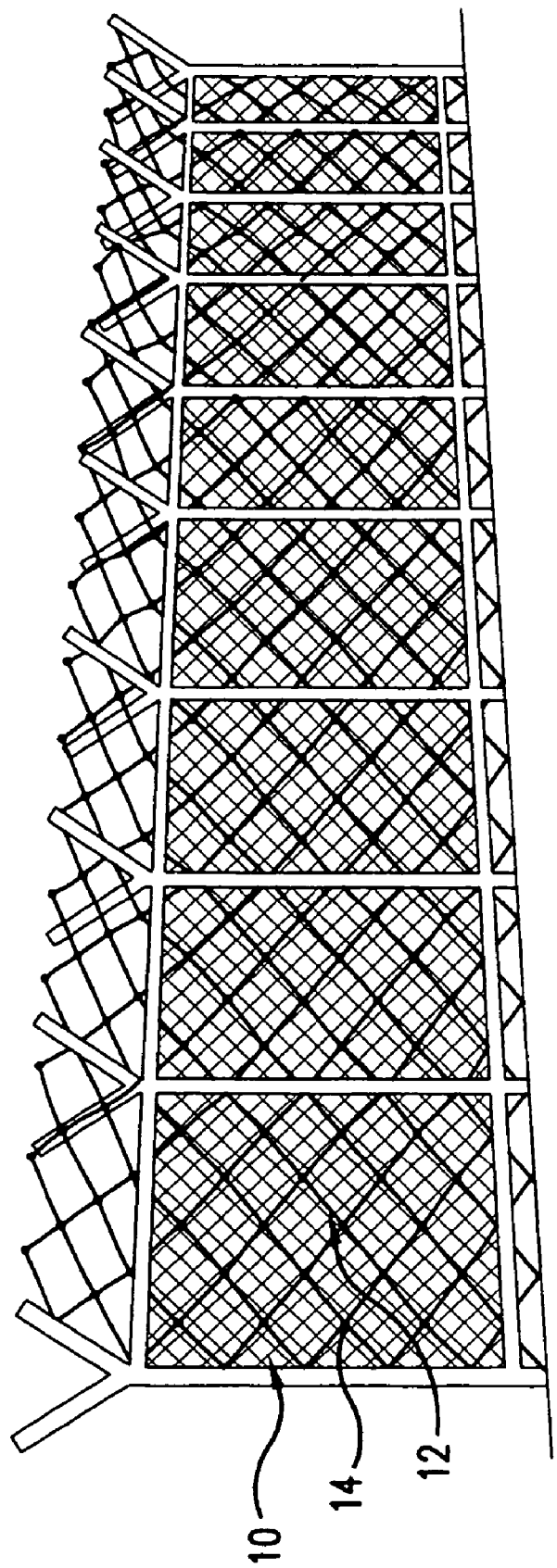
FIG. 1 is a perspective view of a section of chain-link barrier fence with a fiber optic cable monitoring the integrity of the barrier fence, in accordance with the background art.
Figure 2:
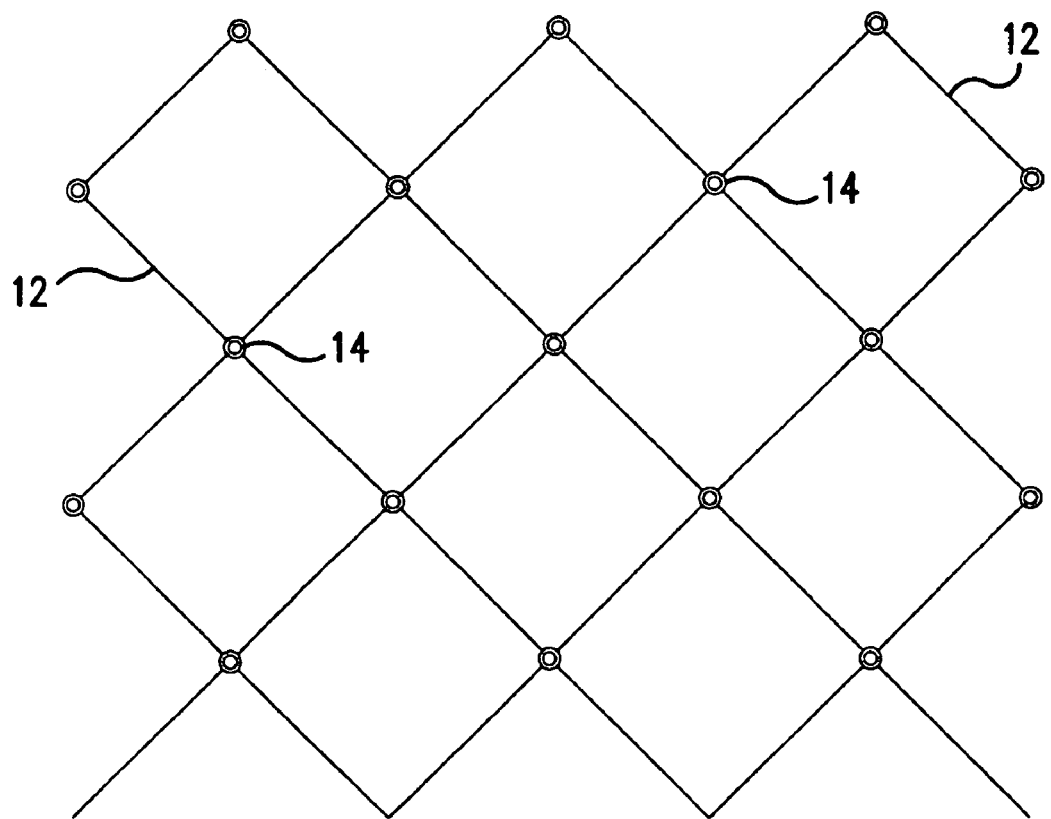
FIG. 2 is a close-up view of a weave pattern of the fiber optic cable of FIG. 1.
Figure 3:
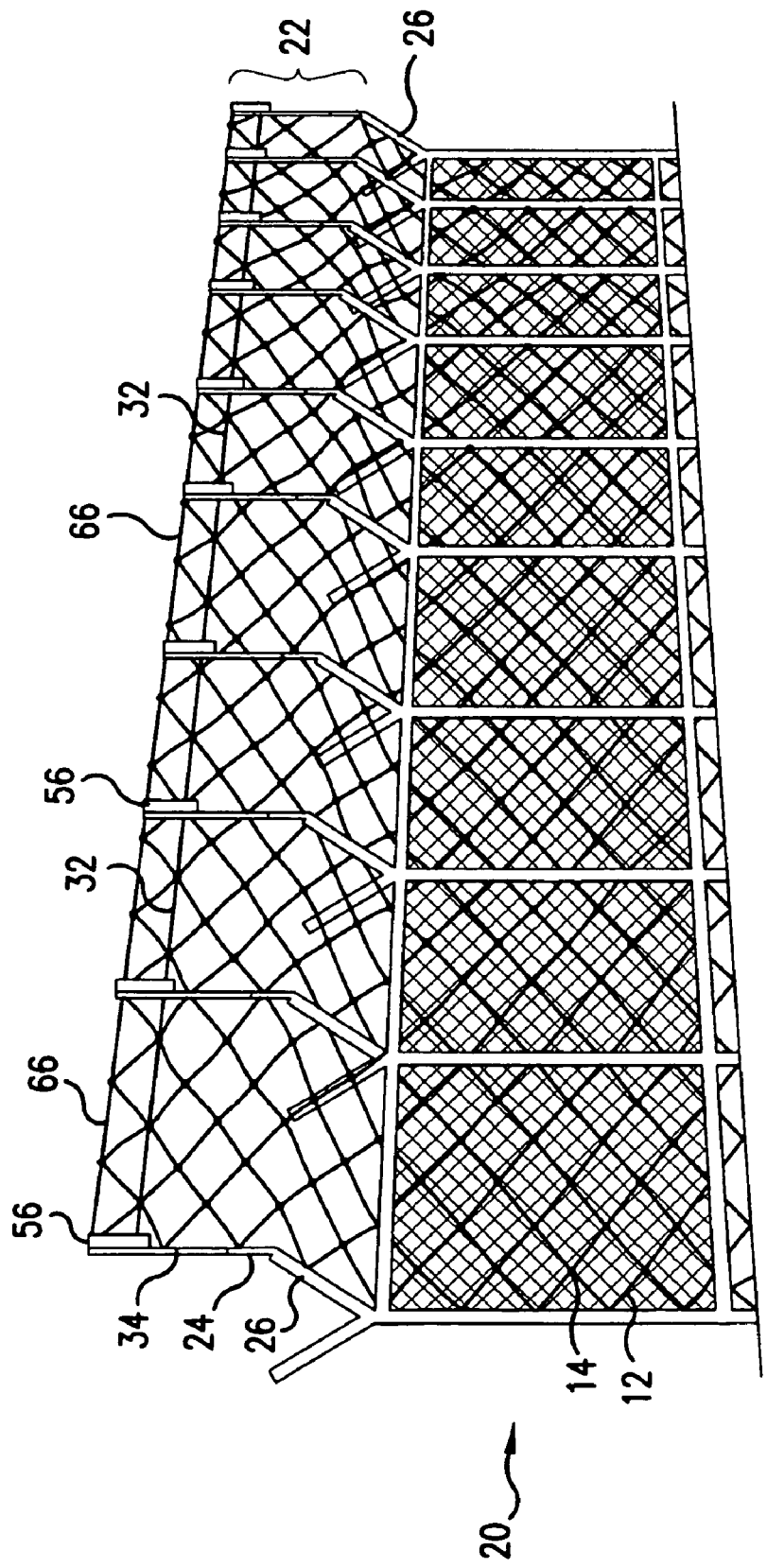
FIG. 3 is a perspective view of a section of chain-link barrier fence with a fiber optic cable monitoring the integrity of the barrier fence and stress inducing devices to detect a ladder leaned against any portion of the fence, in accordance with the present invention.

FIG. 3 is a perspective view of a section of chain-link barrier fence 20, having a security system in accordance with the present invention. The first notable distinction between the present invention and the background art is that the outer V-shaped leg 26 at the top of the security fence 20 has been extended upwardly by a section 22, and the weave pattern of the fiber optic cable 12 has been extended upward into the extended section 22.

Figure 6:
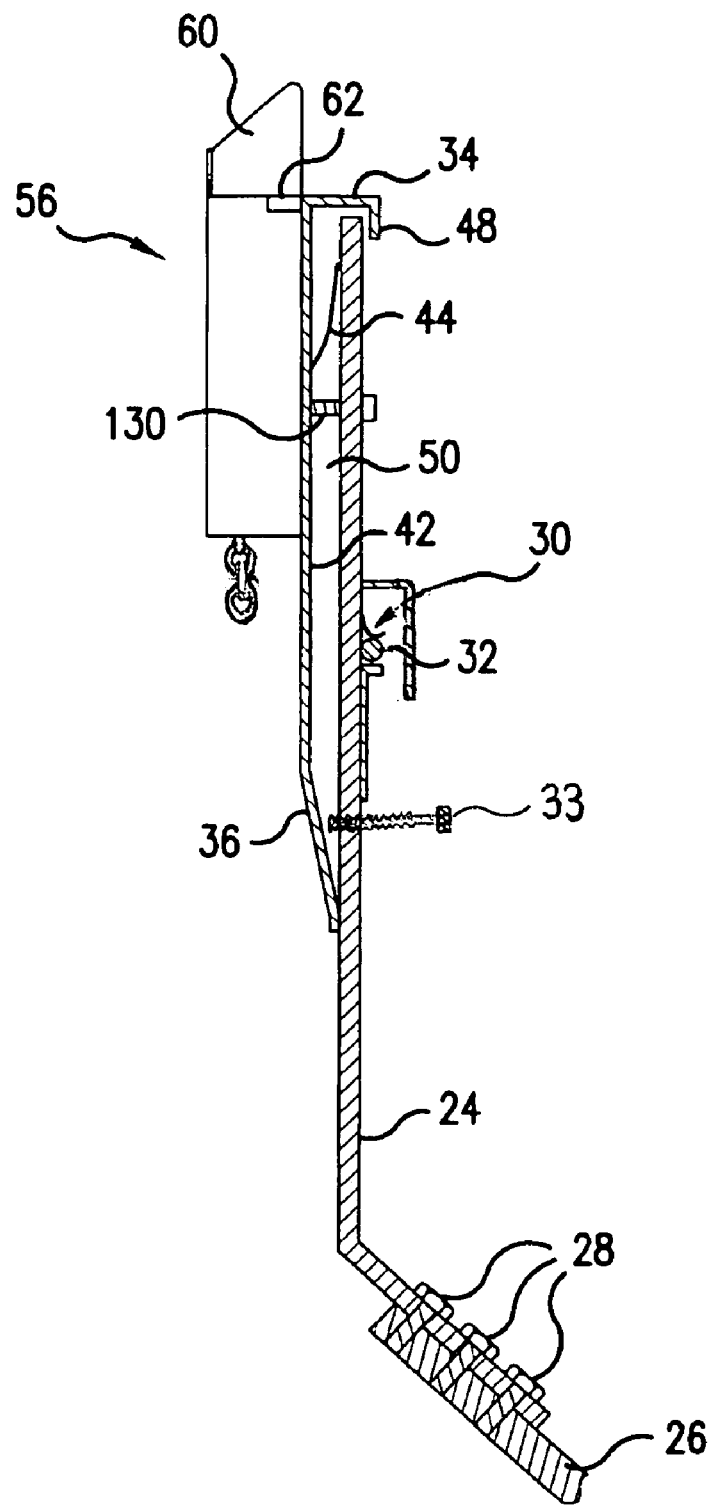
FIG. 6 is a side view of the stress inducing device, the mounting bracket, a support, and a top of a fence post, with the mounting bracket, the support and the fence post shown in cross section.

The extended section 22 is accomplished by attaching supports 24 to the outer V-shaped legs 26 of the fence. FIG. 6 illustrates that each support 24 can be attached to the outer V-shaped leg 26 by a plurality of fasteners 28. Although bolts have been illustrated, it should be apparent that the support 24 could be attached to the outer V-shaped leg 26 by other means, such as screws, or welding, or could be integrally formed.

The support 24 is a substantially flat metal or plastic element, which is resistant to oxidation and deterioration in an outdoor environment. In a preferred embodiment, the support 24 should include some degree of resiliency and flexibility, such that the support 24 can flex several inches in response to a force applied thereto. Flexibility in the supports 24 causes the top portion of the fence to somewhat sway and/or bend down toward the ground under the weight of a person attempting to manually climb the security fence. Hence, the flexibility of the supports 24 makes climbing the security fence more difficult and also tends to better ensure detection of the climbing activity by stress inducing devices 54, as will be better understood from the detailed description to follow.

Each support post includes a clip 30 for supporting a guide wire 32 (See FIG. 6). The guide wire 32 is preferably formed of a strong material, such as a braided stainless steel or galvanized wire. The primary function of the guide wire 32 is to support the weight of the weave pattern of the fiber optic cable 12. A secondary function of the guide wire 32 is to prevent excessive damage to the fiber optic cable 12 during a breach attempt.

For example, if an intruder leaded a ladder against a top portion of the fence between the supports 24, the guide wire 32 would snap out of the clip 30 and proceed to move down a short distance, until contacting a stop member 33. The stop member 33 may be formed as a bolt threaded into or completely through the support 24. The downward movement of the guide wire 32 to the stop member 33 ensures that significant stresses to trigger an alarm are introduced into a fiber optic cable 66 (to be explained later) and perhaps introduced into the fiber optic cable 12 of the weave pattern.

Once the guide wire 32 contacts the stop member 33, further downward movement of the guide wire is halted. Therefore, the ladder will not rip through several layers of the weave pattern of the fiber optic cable 12. Therefore, the stop member 33 limits the damage to the fiber optic cable 12 that will need to be repaired, after a breach attempt is made.

Figure 4:
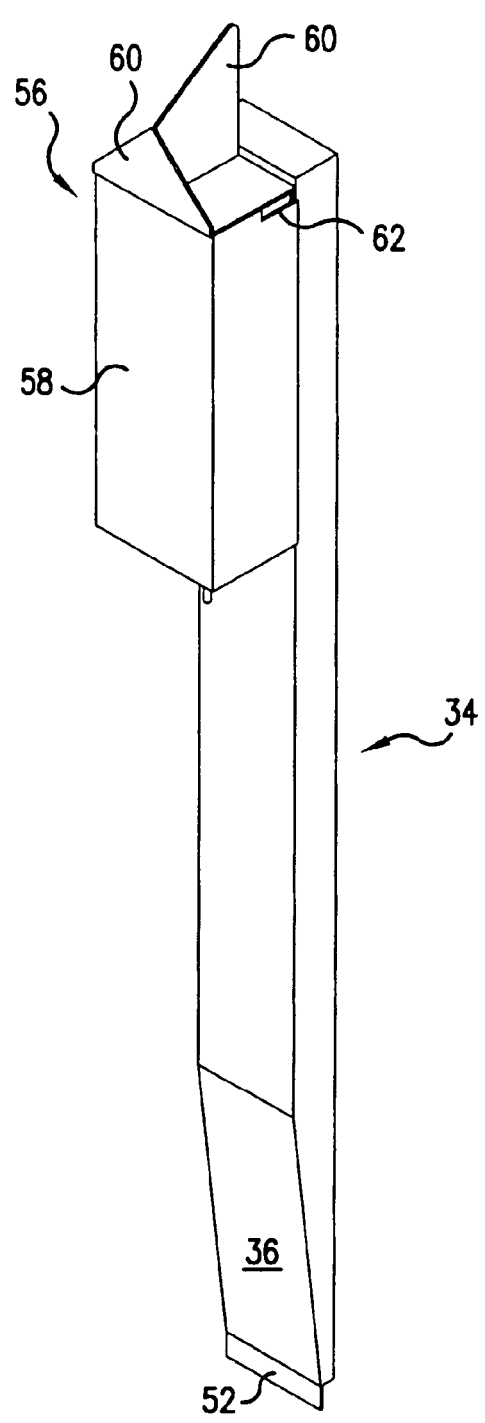
FIG. 4 is front perspective view of the stress inducing device and a mounting bracket of FIG. 3.
Figure 5:
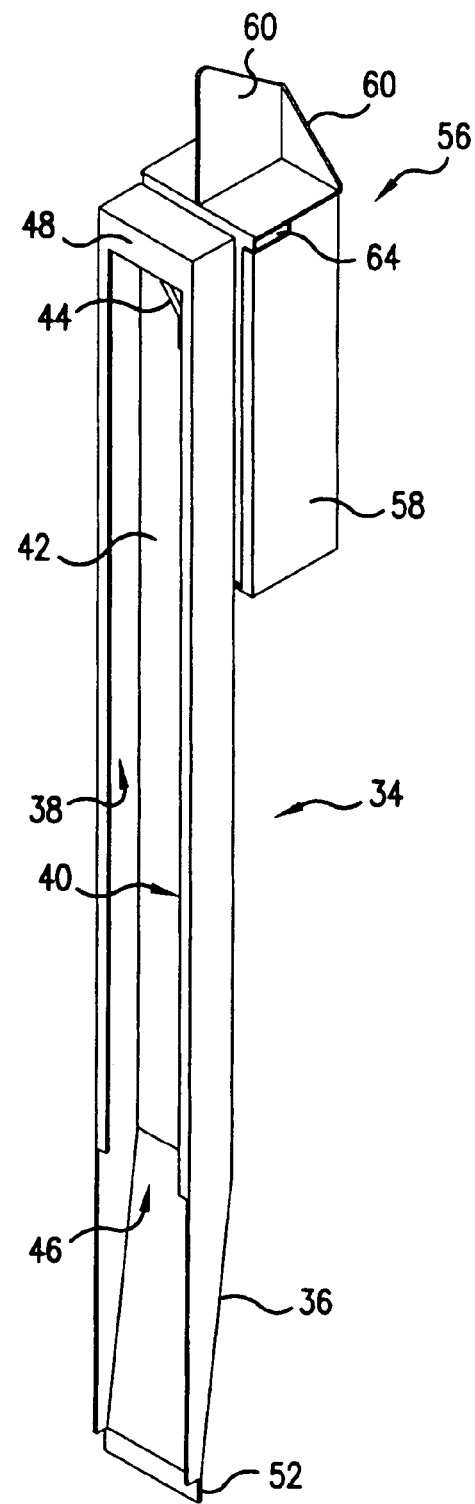
FIG. 5 is rear perspective view of the stress inducing device and mounting bracket of FIG. 3.

A mounting bracket 34 is attached to the top of each of the supports 24. As best seen in FIGS. 4 and 5, the mounting bracket 34 is a generally box-shaped structure, having a wedge-shaped end 36. Guide channels 38 and 40 are formed along sides of the mounting bracket 34. A back wall 42 of the mounting bracket 34 includes a resilient leaf spring 44, as best seen in FIG. 6.

To install the mounting bracket 34 on the support 24, a person inserts the support 24 into an opening 46 in the back of the mounting bracket 34. The mounting bracket 34 is slid down onto the support 24, with the support 24 sliding between the guide channels 38 and 40. As the support approaches an end of the mounting bracket 34, the support 24 is engaged by the leaf spring 44. The engagement by the leaf spring 44 causes the support to abut against a stop tab 48, formed at the top of the mounting bracket 34. Once installed, an air gap 50 will be created between the back wall 42 of the mounting bracket 34 and the support 24.

Once the mounting bracket 34 is installed on the support 24, a screw can be inserted through a lower tab 52 to secure the mounting bracket 34 to the support 24, if desired. A characterizing feature of the mounting bracket 34 is that it can move toward the support 24, if a force is applied to the mounting bracket 34 in the direction of the support 24. If such a force were applied, the mounting bracket 34 would essentially pivot toward the support 24 about the lower tab 52 against the force of the leaf spring 44.

A stress inducing device 56 is attached to the top of each mounting bracket 34. The stress inducing device 56 includes a housing 58 preferably formed of a weather resistant strong material, such as metal. A top of the housing 58 includes angled deflectors 60. The angled deflectors make it difficult to stand on the housing 58 and tend to direct any force applied to the angled deflectors 60 toward the support 24.

A first opening 62 is formed in one side of the housing 58, and a second opening 64 is formed in the other side of the housing 58. A fiber optic cable 66 is strung along a top of the security fence, as best seen in FIG. 3. In a preferred embodiment, the fiber optic cable 66 is not part of the fiber optic cable 12 used in the weave pattern. Rather, one end of the fiber optic cable 66 is directly connected to a transceiver (not shown). The fiber optic cable 66 enters the first opening 62 and exits the second opening 64 in each of the housings 58.

Now, primarily referring to FIGS. 7–10, the interior structures of the stress inducing devices 56 and the operation of those structures will be described. FIG. 7 illustrates the stress inducing device 56 with a front cover 70 removed. As best seen in FIG. 7, the fiber optic cable 66 enters the first opening 62 and passes over a first pulley 72. Next, the fiber optic cable 66 is attached to a first clamp 74. The first clamp 74 can be formed as a curved piece of metal 76 attached to a flat piece of metal 78 by one or more screws 80. The first clamp 74 securely holds the fiber optic cable 66, so that the fiber optic cable 66 cannot slide relative to the first clamp 74.

After the fiber optic cable 66 leaves the first clamp 74, it passes around an outside of a sub-housing 82 and then enters the sub-housing 82. Inside the sub-housing 82, the fiber optic cable 66 is formed into a partial loop 84, as indicated in dashed lines in FIG. 7. Next, the fiber optic cable 66 exits the sub-housing 82.

After exiting the sub-housing 82, the fiber optic cable 66 is attached to a second clamp 86. The second clamp 86 can be formed in an identical manner, or mirror symmetrical manner, as the first clamp 74. The second clamp 86 securely holds the fiber optic cable 66, so that the fiber optic cable 66 cannot slide relative to the second clamp 86. Next, the fiber optic cable 66 passes over a second pulley 88 and exits the housing 58 via the second opening 64.

A trigger assembly 90 is disposed inside the housing 58 and above the sub-housing 82. The trigger assembly 90 includes a rotatable shaft 92, which is secured to a back wall 94 of the housing 58 by two upstanding brackets 96. The first and second clamps 74 and 86 are fixed to opposite ends of the rotatable shaft 92. Any upward movement of fiber optic cable 66 (as viewed in FIG. 7) will cause the first or second clamps 74 or 86 to rotate the shaft 92 in a clockwise direction (as viewed in FIG. 8). A catch 98 is attached to a center section of the rotatable shaft 92. The catch 98 also rotates together with the rotatable shaft 92.

A spring 93 encircles the rotatable shaft 92. The spring 93 is connected to the catch 98 and to one of the brackets 96. The spring 93 applies a force to the catch 98 which tends to cause the shaft 92 to rotate in the counter-clockwise direction, as viewed in FIG. 8.

Figure 10:
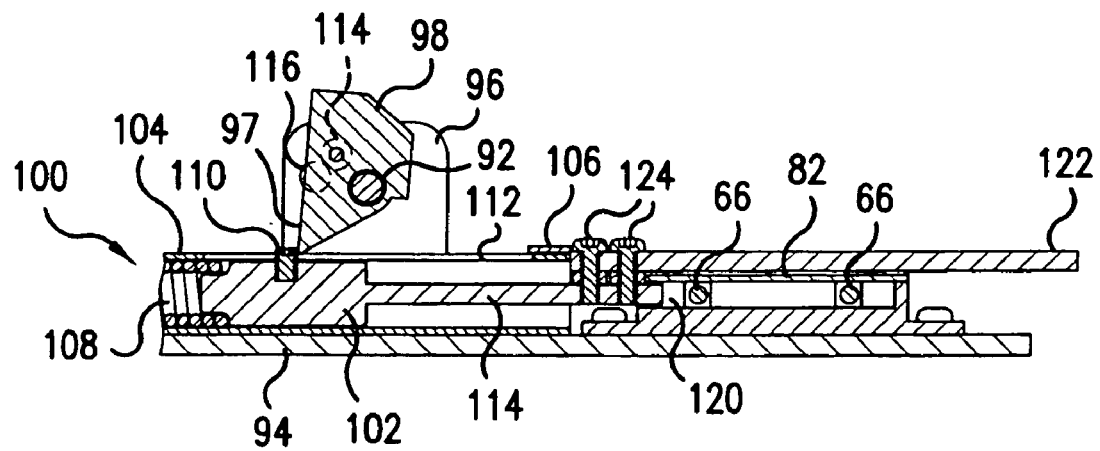
FIG. 10 is a close-up, cross sectional view taken along line X—X in FIG. 7.

Next, a biased pressing member 100 will be described. As best seen in FIG. 10, the biased pressing member includes a plunger 102. The plunger 102 is reciprocally installed within an open-ended cylinder 104. The cylinder 104 is attached to the back wall 94 of the housing 54 by one or more brackets 106. A spring 108 resides inside the cylinder 104 between a closed back of the cylinder 104 and a back of the plunger 102. The spring 108 biases the plunger 102 in a direction toward the sub-housing 82.

A middle portion of the plunger 102 includes a threaded bore into which a screw 110 is engaged. The screw 110 extends away from an outer surface of the plunger 102. The screw 110 is guided to move along a slot 112 formed in the cylinder 104, as the plunger 102 reciprocates within the cylinder 104. The slot 112 is located below the catch 98 of the trigger assembly 90.

As best illustrated in FIG. 10, the screw 110 protrudes away from the outer surface of the plunger 102 to such an extent that a top of the screw 110 can be engaged by an angular extension 97 of the catch 98. When the trigger assembly 90 is in a chocked condition, as illustrated in FIG. 10, the biasing force of the spring 108 causes the top of the screw 110 to bear against the angular extension 97 of the catch 98 with a force. The force of spring 108 has a tendency to rotate the catch in the counter-clockwise direction (as viewed in FIG. 10), which is the same direction that the spring 93 tends to rotate the catch 98.

To prevent the catch 98 from rotating in the counter-clockwise direction and allowing the screw 110 to slip past the angular extension 97, first and second stop members 114 and 116 are provided. The first stop member 114 is attached to the catch 98, and may be a screw threaded into a side of the catch 98. The second stop member 116 is attached one of the adjacent brackets 96, and may also be a screw threaded into a side of the bracket 96. The relative locations of the first and second stop members 114 and 116 result in the abutment of the first and second stop members 114 and 116 when the trigger assembly 90 is in the cocked condition.

The trigger assembly 90 also has a released condition. The released condition occurs whenever the "cocked" catch 98 is slightly rotated in the clockwise direction (as viewed in FIG. 10). Looking at the chocked condition of the trigger assembly 90 illustrated in FIG. 10, if the catch 98 were slightly rotated in the clockwise direction, the angular extension 97 would push against the screw 110 and cause the plunger 102 to slightly move into the cylinder 104 against the biasing force of the spring 108. Eventually, after a rotation of a few degrees of the shaft 92, an end point of the angular extension 97 would clear the top of the screw 110. At this time, there would be no structure obstructing the movement path of the plunger 102. The plunger 102 would quick move, in a snapping fashion, toward the sub-housing 82 due to the biasing force of the spring 108.

Figure 9:
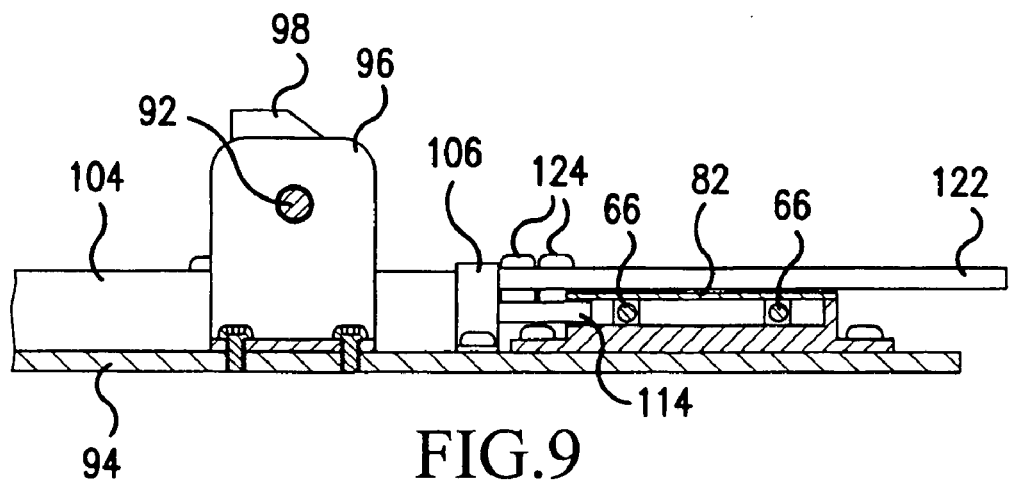
FIG. 9 is a close-up, cross sectional view taken along line IV—IV in FIG. 7.

A lower end of the plunger 102 (as viewed in FIGS. 7 and 8) includes a pressing arm 114, as best seen in FIGS. 9–10. The pressing arm 114 extends into an opening 120 formed at a top side of the sub-housing 82. When the trigger assembly 90 is in the chocked condition, the pressing arm 114 only slightly protrudes into the sub-housing 82 and does not contact or interfere with the loop 84 of fiber optic cable 66 disposed therein. When the trigger assembly 90 is in the released condition, the pressing arm 114 protrudes significantly into the sub-housing 82 and contacts the loop 84 of the fiber optic cable 66 disposed therein. In fact, in the released condition of the trigger assembly 90, the pressing arm 114 pinches the fiber optic cable 66 and interrupts a flow of light therethrough.

Now, a first manner of operation of the stress inducing device 56 will be described. As best illustrated in FIG. 3, a support 24 is mounted to the outer V-shaped leg 26 of each fence post. A mounting bracket 34 is slid over each support 24. A stress inducing device 56 is mounted proximate a top of each mounting bracket 34. A single run of fiber optic cable 66 is passed through each of the stress inducing devices 56, in a manner as illustrated in FIG. 7. And lasted, the trigger assemblies 90 of each stress inducing device 56 are set to the chocked condition.

If a person leans a ladder against a top of the fence between the fence posts, the ladder will contact the fiber optic cable 66. The weight of the ladder alone, or the combined weight of the ladder and a climber, will place the fiber optic cable 66 under tension. The tension in the fiber optic cable 66 will be intensified when the guide wire 32, under the weight of the ladder, snaps out of the clip 30 and falls down to the stop member 33, thus allowing a greater downward movement of the fiber optic cable 66. The tension in the fiber optic cable 66 will be transmitted to one or both of the adjacent stress inducing devices 56 mounted on the supports 26 bordering the section of fence against which the ladder is leaning.

The tension on the fiber optic cable 66 will be transmitted around the first or second pulley 72 or 88 and will cause the first or second clamp 74 or 86, respectively, to move upwardly (as viewed in FIG. 7). Any upward movement of the first or second clamp 74 or 86 will cause the shaft 92 to rotate in the clockwise direction (as viewed in FIG. 10). The clockwise rotation of the shaft 92 will cause the end of the angular extension 97 of the catch 98 to release its engagement with the screw 110. Consequently, the trigger assembly 90 will assume its released condition and the fiber optic cable 66 within the sub-housing 82 will be pinched.

The pinching of the fiber optic cable 66 will be detected by the transceiver connected to one end of the fiber optic cable 66. Moreover, a rather specific location of the pinch in the fiber optic cable and hence an area of a potential breach in the security fence can be calculated. The location can be calculated by measuring the time that it takes a light pulse to reach the pinch in the fiber optic cable 66 and be partially reflected by the pinch back to the transceiver. For a better understanding of such techniques, reference can be had to Applicant's prior applications, which were incorporated by reference above.

An indicator 122 is attached to the pressing arm 114 by one or more screws 124, and moves in unison with the pressing arm 114. The indicator 122 may be a rigid rod (as illustrated in FIGS. 7–10), or more preferably a chain (as illustrated in FIG. 6). In the chocked condition of the trigger assembly 90, the indicator 122 slightly protrudes from an opening 126 in the bottom of the housing 58. In the released condition of the trigger assembly 90, the indicator 122 protrudes further from the opening 126 in the bottom of the housing 58. The indicator 122 is particularly useful in quickly determining the status of the trigger assembly 90, which would otherwise not be visible from outside the housing 58.

Once the trigger assembly 90 is in its released condition, the spring 93 will rotate the catch 98 in the counterclockwise direction (as viewed in FIG. 10) until the first and second stop members 114 and 116 contact each other. To reset the trigger assembly 90 to the chocked condition, a user presses the plunger 102 back into the cylinder 104 until the screw 110 is engaged by the end of the angular extension 97 of the catch 98. If the indicator 122 is a solid rod, it is possible to reset the trigger assembly 90 from outside the housing 58 by pressing the indicator rod 122 up toward the opening 126 in the bottom of the housing 58. If the indicator 122 is a chain, it will be necessary to open the housing 58 or to insert a tool into the opening 126 to reset the trigger assembly 90.

If there is a danger that a person might hold the indicator rod 122 to prevent the plunger 102 from moving, the indicator rod can be replace with an indicator chain. Furthermore, it is also keeping with the present invention to not provide an indicator 122, and to substantially seal the housing 58 to prevent the invasion of foreign materials into the housing 58.

If a person leans a ladder directly against the stress inducing device 56, little if any tension will be placed upon the fiber optic cable 66. Hence, the first and second clamps 74 and 86 may not cause the shaft 92 to rotate sufficiently to cause the catch 98 to release the screw 110. Under such circumstances, it might be possible for a person could climb to the top of a ladder, leaned against the stress inducing device 56, and jump to the ground on the other side of the fence, without causing the trigger assembly 90 to release the pressing arm 114.

To address this concern, a key 130 is attached to the support 24. The key 130 could be a bolt threaded through the support 24, which extends toward the stress inducing device 56, as best seen in FIG. 6. A first keyhole is provided in the mounting bracket 34 and a second keyhole 132 is provided in the back wall 94. The key 130 bears against a trigger release 134. The trigger release 134 is attached to the first clamp 74. Any movement of the trigger release 134 will translate into a rotate of the shaft 92.

Looking at FIG. 6, it can be seen that the leaf spring 44 applies a force tending to maintain a distance or gap between the support 24 and the mounting bracket 34. If a force is applied against the stress inducing device 56, the force in the leaf spring 44 will be overcome and the mounting bracket 34 will move toward the support 24. When the mounting bracket 34 moves toward the support 24, the key 130 presses against the trigger release 134, causing the shaft 92 to rotate clockwise (as viewed in FIG. 10). Such a rotation in the shaft 92 will cause the trigger assembly 90 to move from the chocked condition to the released condition. Hence, the stress inducing device 56 can sense that a ladder or weight is being placed against its housing 58 and trigger an alarm by pinching the fiber optic cable 66 within the sub-housing 82.

The housing 58 is composed of two primary parts. The first part includes the back wall 94, which is integrally formed with an L-shaped extension 69 having the angled deflectors 60. The second part includes the front cover 70. As best seen in FIG. 8, the front cover 70 can be removed from the back wall 94 by removing two screws 71, which pass through the L-shaped extension 69 and into threaded bores in the front cover 70. Once the screws 71 are removed, the front cover 70 can be slid downward and off of the back wall 94, to reveal the interior of the stress inducing device 53.

Another concern of the present invention is to prevent a person from opening the stress inducing device 53 and disassembling or rendering inoperative the structural components therein, so that a ladder can be used to climb the fence without detection. To this end, a backside 130 of the front cover 70 is provided with a leaf spring 132. The leaf spring 132 may be connected to the backside 130 of the cover 70 by welding, rivets, adhesive, etc.

The leaf spring 132 has a shape that includes a rising ridge 134 and a descending ridge 136. If a person removes the screws 71 and attempts to slide the front cover 70 off of the stress inducing device 53, the rising ridge 134 will contact the catch 98 and cause a clockwise rotation of the shaft 92 (as viewed in FIG. 10). The contact between the rising ridge 134 and the catch 98 will cause the trigger assembly 90 in the chocked condition to be moved to the released position. Hence, the person's removal of the front cover 70 will trigger an alarm and be detected.

Once the front cover 70 is removed, a trigger assembly 90 in the released condition can be manually reset to the chocked condition. Next, the front cover 70 can be reinstalled by sliding the front cover 70 upwardly along the back wall 94. When the front cover 70 moves upwardly, the descending ridge 136 will contact the catch 98 and attempt to rotate the shaft 92 counterclockwise (as viewed in FIG. 10). Since the trigger assembly 90 in the chocked condition cannot be further rotated in the counterclockwise direction due to the engagement of the first and second stop members 114 and 116, the leaf spring 132 will simply deflect toward the backside 130 of the front cover 70. Hence, the front cover 70 can be installed while the trigger assembly 90 is maintained in the chocked condition.

The present invention is susceptible to various modifications. For example, the coil spring 108 could be replaced with other biasing devices, such as a leaf spring or a rubber or synthetic elastic member. Also, gravity could provide the biasing force to the plunger 102, especially if the plunger 102 has a sufficient weight.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed:

1. A security device for inducing stress into a fiber optic cable comprising:
    a housing;
    a first and second opening in said housing for passing a fiber optic cable through said housing;
    an area within said housing for possessing a first portion of the fiber optic cable;
    a biased pressing member, biased toward said area; and
    a trigger assembly for holding said biased pressing member against its biasing force when said trigger assembly is in a cocked condition, and for releasing said biased pressing member to move toward said area when said trigger assembly is in a released condition, wherein said biased pressing member causes a flow of light though the first portion of the fiber optic cable to be interfered with, when said trigger assembly is in said released condition.

2. The device according to claim 1, further comprising:
    a first pulley proximate said first opening in said housing, wherein the fiber optic cable is routable through said first opening and around a portion of said first pulley.

3. The device according to claim 2, further comprising:
    a second pulley proximate said second opening in said housing, wherein the fiber optic cable is routable through said second opening and around a portion of said second pulley.

4. The device according to claim 1, wherein said trigger assembly includes:
    a rotatable shaft connected to said housing; and
    a catch for engaging a portion of said biased pressing member, wherein said catch is attached to said rotatable shaft to rotate together with said rotatable shaft between said cocked condition and said released condition of said trigger assembly.

5. The device according to claim 4, wherein said trigger assembly further includes:
    a first clamp for clamping a second portion of the fiber optic cable, located between said first opening and said area for possessing the first portion of the fiber optic cable, said first clamp being attached to said rotatable shaft.

6. The device according to claim 5, wherein said trigger assembly further includes:
    a second clamp for clamping a third portion of the fiber optic cable, located between said second opening and said area for possessing the first portion of the fiber optic cable, said second clamp being attached to said rotatable shaft.

7. The device according to claim 1, further comprising:
    an indicator opening in said housing; and
    an indicator attached to said biased pressing member and extending through said indicator opening, said indicator presenting an indication which is readable outside of said housing as to whether said trigger assembly is in said cocked condition or said released condition.

8. The device according to claim 7, wherein said indicator is a chain.

9. The device according to claim 7, wherein said indicator is a solid rod, which can be used to reset said trigger assembly to said cocked position.

10. The device according to claim 1, wherein said biased pressing member is biased by a spring.

11. The device according to claim 10, wherein said spring is contained within a cylinder having an open end, said cylinder is attached to said housing, and said cylinder is sized to accept a portion of said biased pressing member in a sliding relationship therein through said open end.

12. The device according to claim 1, wherein said area for possessing the first portion of the fiber optic cable is a defined within a sub-housing contained within said housing, and wherein said biased pressing member protrudes into said sub-housing when said trigger assembly is in said released condition.

13. The device according to claim 1, wherein said housing includes a first piece and a second piece, which can be remove from said first piece to gain access to an interior of said housing, and wherein said second piece includes a tripping member for engaging said trigger assembly as said second piece is removed from said first piece, such that if said trigger assembly is in said cocked condition, removing said second piece from said first piece will cause said trigger assembly to move to said released condition.

14. The device according to claim 13, wherein said tripping member is a resilient tab attached to a portion of said first piece facing an interior of said housing.

15. The device according to claim 1, further comprising:
    a key for connecting to a portion of a fence to which said housing will be attached, wherein said housing includes a key opening for receiving said key, such that a distal end of said key resides proximate said trigger assembly inside said housing.

16. The device according to claim 15, wherein if said housing is moved toward said key, said key will engage said trigger assembly and cause said trigger assembly to move to said released condition.

17. The device according to claim 15, further comprising:
    a mounting bracket for attaching said housing to the portion of the fence, wherein said mounting bracket can move slightly toward and away from the fence at an upper portion of said mounting bracket.

18. The device according to claim 17, wherein a length of said mounting bracket from its upper end to its lower end is at least twice a length of said housing from its upper end to its lower end, such that said mounting bracket extends below said housing for a distance greater than the length of said housing.

19. The device according to claim 17, wherein said mounting bracket includes a channel for sliding over a linear member of the fence, and wherein said lower end of said mounting bracket is wedge shaped.

20. The device according to claim 17, wherein said mounting bracket includes a slot through which said key passes before passing through said key opening in said housing.

21. A security device for detecting an intrusion into a secure area comprising:
    a fence for extending along a border of the secure area;
    a plurality of supports attached proximate a top of said fence;

a fiber optic cable extending along said fence proximate said top of said fence; and a plurality of housings, each being respectively attached to one of said plurality of supports, each housing including:

a first and second opening in said housing for passing said fiber optic cable through said housing;

an area within said housing possessing a first portion of said fiber optic cable;

a biased pressing member, biased toward said area; and a trigger assembly for holding said biased pressing member against its biasing force when said trigger assembly is in a cocked condition, and for releasing said biased pressing member to move toward said area when said trigger assembly is in a released condition, wherein said biased pressing member causes a flow of light though said first portion of said fiber optic cable to be interfered with, when said trigger assembly is in said released condition.

22. The device according to claim 21, wherein said area possessing said first portion of said fiber optic cable is a defined within a sub-housing contained within said housing.

23. The device according to claim 22, wherein said first portion of said fiber optic cable is looped within said sub-housing, and wherein said biased pressing member protrudes into said sub-housing when said trigger assembly is in said released condition to press against said loop.

24. The device according to claim 21, further comprising:

a plurality of fence posts supporting said fence, wherein each of said plurality of supports is attached to one of said plurality of fence posts, respectively.

25. The device according to claim 21, further comprising:

a plurality of keys, each key being attached to one of said plurality of supports, each housing including a key opening to receive a key therethrough, such that a distal end of said key resides proximate said trigger assembly inside said respective housing, wherein if said housing is moved toward its support, said key will engage said trigger assembly and cause said trigger assembly to move to said released condition.

* * * * *